United States Patent
Scully-Power et al.

(10) Patent No.: US 9,195,817 B2
(45) Date of Patent: Nov. 24, 2015

(54) TECHNIQUES FOR BIOMETRIC AUTHENTICATION OF USER OF MOBILE DEVICE

(71) Applicant: ChamTech Technologies Incorporated, Wilmington, DE (US)

(72) Inventors: Paul Scully-Power, Washington, DC (US); Rhett Francis Spencer, Heber City, UT (US); Anthony Joseph Sutera, Heber City, UT (US)

(73) Assignee: nCap Holdings, LLC, Herber City, UT (US)

( * ) Notice: Subject to any disclaimer, the term of this patent is extended or adjusted under 35 U.S.C. 154(b) by 0 days.

(21) Appl. No.: 14/101,285

(22) Filed: Dec. 9, 2013

(65) Prior Publication Data

US 2014/0230047 A1    Aug. 14, 2014

Related U.S. Application Data

(60) Provisional application No. 61/734,963, filed on Dec. 7, 2012.

(51) Int. Cl.
| | |
|---|---|
| *G06F 21/32* | (2013.01) |
| *G06Q 20/40* | (2012.01) |
| *G06F 21/44* | (2013.01) |
| *H04L 29/06* | (2006.01) |
| *G06F 21/34* | (2013.01) |

(52) U.S. Cl.
CPC ................ *G06F 21/32* (2013.01); *G06F 21/34* (2013.01); *G06F 21/44* (2013.01); *G06Q 20/40145* (2013.01); *H04L 63/0853* (2013.01); *H04L 63/0861* (2013.01)

(58) Field of Classification Search
None
See application file for complete search history.

(56) References Cited

U.S. PATENT DOCUMENTS

| | | | | |
|---|---|---|---|---|
| 6,441,482 | B1 * | 8/2002 | Foster | 257/724 |
| 2001/0017584 | A1 * | 8/2001 | Shinzaki | 340/5.52 |
| 2001/0039199 | A1 * | 11/2001 | Shinzaki | 455/572 |
| 2005/0071635 | A1 * | 3/2005 | Furuyama | 713/168 |
| 2007/0026906 | A1 | 2/2007 | MacFarlane et al. | |
| 2009/0069050 | A1 * | 3/2009 | Jain et al. | 455/558 |
| 2011/0287726 | A1 * | 11/2011 | Huang | 455/90.3 |
| 2012/0304269 | A1 | 11/2012 | Rodriguez et al. | |
| 2013/0029640 | A1 * | 1/2013 | Wong et al. | 455/411 |

(Continued)

OTHER PUBLICATIONS

Duce, "Shutterly Custom Photo Phone Case #Giveaway", mommieswithcents blog, Apr. 17, 2012.

*Primary Examiner* — Venkat Perungavoor
*Assistant Examiner* — Christopher Ruprecht
(74) *Attorney, Agent, or Firm* — Jefferson IP Law, LLP; Raymond B. Persino

(57) ABSTRACT

A method for biometric authentication of a user of a mobile device, and a case for performing the method is provided. The method includes, by the case, coupling the mobile device to the case, receiving from the mobile device biometric data of the user of the mobile device that was captured by the mobile device, storing the biometric data, receiving a request from the mobile device for authenticating the user of the mobile device, the request including biometric data captured by the mobile device, comparing the biometric data stored in the case and the biometric data included in the request, and sending to the mobile device a response to the request for authenticating the user of the mobile device based on a result of the comparison, wherein the response to the request is for use by the mobile device to perform an operation based on the authentication of the user.

21 Claims, 7 Drawing Sheets

(56) References Cited

U.S. PATENT DOCUMENTS

| | | | |
|---|---|---|---|
| 2013/0109316 A1* | 5/2013 | Lee | 455/41.2 |
| 2013/0120913 A1* | 5/2013 | Petersson et al. | 361/679.01 |
| 2013/0336546 A1* | 12/2013 | Pritikin et al. | 382/116 |
| 2014/0342778 A1* | 11/2014 | Locher | 455/558 |

* cited by examiner

TECHNIQUES FOR BIOMETRIC AUTHENTICATION OF USER OF MOBILE DEVICE

CROSS-REFERENCE TO RELATED APPLICATION

This application claims the benefit under 35 U.S.C. §119 (e) of a U.S. Provisional application filed on Dec. 7, 2012 in the U.S. Patent and Trademark Office and assigned Ser. No. 61/734,963, the entire disclosure of which is hereby incorporated by reference.

TECHNICAL FIELD

The present disclosure relates to biometric authentication. More particularly, the present disclosure relates to techniques for biometric authentication of a user of a mobile device.

BACKGROUND

A continuing issue with authentication is that one can authenticate a machine or device but not a user of the machine or device. For example, anyone with a valid hard token and/or pin or password can be authenticated for the purpose of logging onto a device or network; there is no test to see if the user is an actual authorized user. Accordingly, there is a need to address this vulnerability and provide a capability of authenticating the user.

In addition, the theft of smart card data or credit card data and unauthorized charges cost the credit card industry vast sums of money each year. Merchants and smart card users end up bearing the burden of these unauthorized theft transactions. Accordingly, there is a need to address this vulnerability and provide authentication during a credit card transaction to help reduce these losses.

With advances in electronics and communication technologies, and a trend toward convergence, mobile devices have evolved into smartphones that are ubiquitous in modern society. Accordingly, there is a desire to utilize the capabilities of mobile devices and/or add additional functionality thereto.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide techniques for biometric authentication of a user of a mobile device.

In accordance with an aspect of the present disclosure, a method for biometric authentication of a user of a mobile device is provided. The method includes coupling the mobile device to a case for the mobile device, receiving from the mobile device, by the case, biometric data of the user of the mobile device that was captured by the mobile device, storing, by the case, the biometric data of the user of the mobile device that was received from the mobile device, receiving a request from the mobile device, by the case, for authenticating the user of the mobile device, the request including biometric data captured by the mobile device, comparing, by the case, the biometric data stored in the case and the biometric data included in the request, and sending to the mobile device, by the case, a response to the request for authenticating the user of the mobile device based on a result of the comparison, wherein the response to the request for authenticating the user of the mobile device is for use by the mobile device to perform an operation based on the authentication of the user.

In accordance with another aspect of the present disclosure, case for a mobile device for biometric authentication of a user of the mobile device is provided. The case includes a housing configured to removably retain the mobile device, the housing including a memory, a communication unit, and a processor unit. The memory is configured to store biometric data of a user of the mobile device. The communication unit is configured to communicate with the mobile device. The processor unit is configured to communicate and control the memory and the communication unit to receive from the mobile device biometric data of the user of the mobile device that was captured by the mobile device, store the biometric data of the user of the mobile device that was received from the mobile device, receive a request from the mobile device for authenticating the user of the mobile device, the request including biometric data captured by the mobile device, compare the biometric data stored in the case and the biometric data included in the request, and send to the mobile device a response to the request for authenticating the user of the mobile device based on a result of the comparison, wherein the response to the request for authenticating the user of the mobile device is for use by the mobile device to perform an operation based on the authentication of the user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
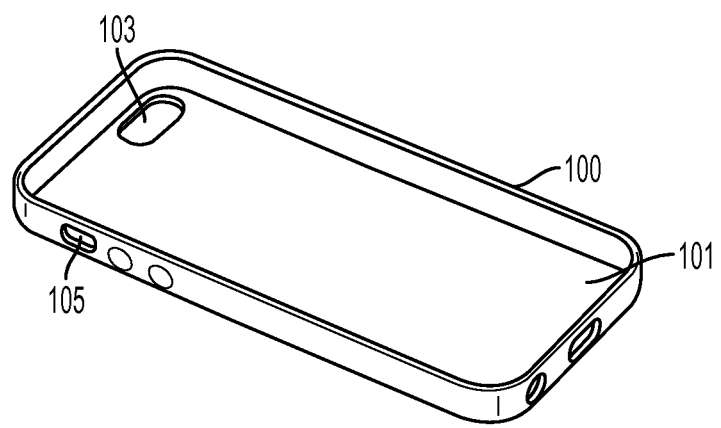
FIG. 1A illustrates a case for a mobile device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1A through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Techniques are provided in the present disclosure to integrate a set of technologies to enable biometric authentication of a user of a mobile device. The biometric authentication of the user of the mobile device may enable, for example, secure logon to at least one of a device and a network without using a password, a pin, a hard token, or the like. Also, the biometric authentication of the user of the mobile device may enable, for example, authentication during a smartcard or credit card transaction with a high degree of confidence. The techniques may provide the above benefits while providing the added benefit of minimizing the number of devices a user needs to carry. One embodiment of the new approach consists of a number of technologies embedded in a case for a mobile device that, once installed, enables the user to be biometrically authenticated throughout any network and/or credit card payment session anywhere in the world.

While the present disclosure refers to a mobile device for conciseness in explanation, the present technique may be applied to any electronic device. For example, the present technique may be applied to a smartphone, a Personal Computer (PC), Personal Digital Assistant (PDA), a tablet PC, a mobile terminal, a Personal Media Player (PMP), a digital camera, and any other similar and/or suitable electronic device.

While the present disclosure refers to a separate case for a mobile device and a mobile device, the present disclosure is equally applicable to an embodiment where one or more of the structures and/or functions from one of the case and the mobile device as described herein, are disposed in the other one of the case and the mobile device. For example, the present disclosure is equally applicable to an embodiment where the case and mobile device are combined in a single device.

With the trend toward convergence, mobile devices include or may include a variety of input and sensor devices that may be used to gather biometric information from a user. Such biometric information may be used to authenticate a user with a high degree of confidence. However, the mobile device of the related art may lack the ability to store the biometric information with a sufficient degree of security. Accordingly, a technique is proposed herein to add the ability to secularly store the biometric information by coupling a case for the mobile device to the mobile device that includes such a capability. Further, the secularly stored biometric information may be utilized by applications installed on the mobile device, by the mobile device, or by the case, to provide a variety of secured functions. In addition, the case may be locked to the mobile device so as to only function to provide biometric authentication for a mobile device to which it is locked.

Examples of biometric data of the user include, but are not limited to, a single fingerprint, a multiple finger fingerprint, a palm print, an iris scan, a voiceprint, a facial recognition (with or without motion adjustment), a repeatable motion, a repeatable key or touchscreen input, and any other similar and/or suitable form of biometric data of the user. The biometric data of the user may be captured using sensors disposed in the mobile device and/or sensors disposed in the case, which include the capability to capture the biometric data of the user.

While the present disclosure describes storing and using biometric data for one user, the present disclosure is equally applicable to an embodiment where biometric data for more than one user is stored and used. Similarly, while the present disclosure describes storing and using at least one identifying data of the mobile device so as to lock the case to the mobile device, the present disclosure is equally applicable to an embodiment where at least one identifying data of a plurality of mobile device is stored and used so as to lock the case to the plurality of mobile devices.

Figure 1B:
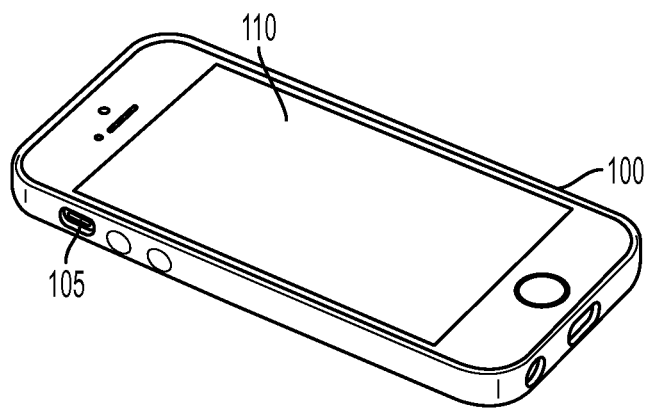
FIG. 1B illustrates the case of FIG. 1A with a mobile device disposed therein according to an embodiment of the present disclosure.

FIG. 1A illustrates a case for a mobile device according to an embodiment of the present disclosure. FIG. 1B illustrates the case of FIG. 1A with a mobile device disposed therein according to an embodiment of the present disclosure.

Referring to FIGS. 1A and 1B, a case 100 for a mobile device 110 is shown. The case 100 includes a housing formed so as to securely retain the mobile device 110 as shown in FIG. 1B. Herein, the term "case" and "housing" may referred to interchangeably. The case 100 may be constructed of materials and/or a structure that affords a degree of protection to the mobile device 110 from scratches, being crushed, and/or being dropped. The case 100 may be constructed to correspond to a flexibility of the mobile device 110. The case 100 may include a cavity 101 within which the mobile device 110 may be disposed. The case 100, or portions thereof, may be sufficiently flexible so as to allow the mobile device 110 to be inserted into the cavity 101 while enabling the case 100 to retain the mobile device 110 once the mobile device 110 is inserted in the cavity 101. The case 100 may include one or more holes 103 there through so as to not block one of more a camera, a flash, an electrical connector, a speaker, a microphone, a card slot, a button, a switch, etc. of the mobile device 110. The case 100 may include one or more portions 105 that are designed to be aligned and enable operation of buttons and/or switches of the mobile device 110 through the case 100. Embedded within the case 100 may be electrical components used to carry out embodiments of the present disclosure, which are described further below. In one embodiment, the case 100 includes provisions to mitigate the ability to tamper with the electrical components. For example, the case 100 may include provisions to prevent one or more operations thereof if the case 100 is tampered with.

Figure 2:
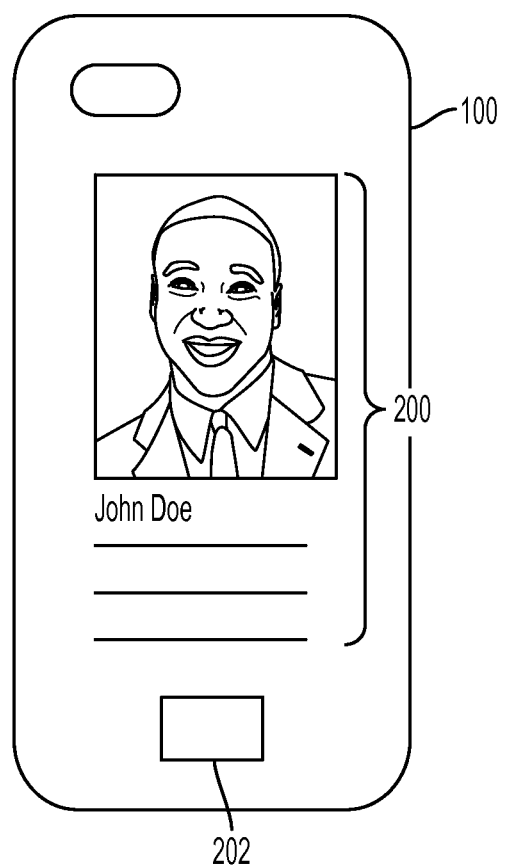
FIG. 2 illustrates a case for a mobile device including identifying information of a user according to an embodiment of the present disclosure.

FIG. 2 illustrates a case for a mobile device including identifying information of a user according to an embodiment of the present disclosure.

Referring to FIG. 2, the case 100 may have printed thereon or formed therein one or more images and/or alphanumeric characters 200 that are visible from the outside. For example, the one or more images and/or alphanumeric characters 200 may form an IDentification (ID) card, a driver's license, a credit card, a government or corporate security card, a badge, etc. that is visible from the outside. The one or more images and/or alphanumeric characters 200 may include, for example, a photograph with a color security background depending on level of clearance or access, a full name and title of the user and a logo of an agency affiliation or company. In addition, the one or more images and/or alphanumeric characters 200 may serve to provide an additional degree of user authentication. Also, the one or more images and/or alphanumeric characters 200 may serve to provide an affiliation, such as with a credit card company. In one embodiment, the case 100 includes provisions, such as an inlay or other security device or mechanism, to mitigate the ability to tamper with the one or more images and/or alphanumeric characters 200. In one embodiment, the case 100 includes provisions to enable it to be worn by the user. When warn by the user, the one or more images and/or alphanumeric characters 200 may be visible.

In another embodiment, one or more images and/or alphanumeric characters 200 may be displayed on one of a primary and secondary display of the mobile device 110. In this embodiment, the display of the one or more images and/or alphanumeric characters 200 may not occur until the user is biometrically authenticated.

The case 100 may further include circuitry and/or a chip 202 (e.g., Radio Frequency ID (RFID) chip) that can be emulated or is the same used in a card having a touch or touchless interface, the function of which, the case 100 is duplicating. For example, the case 100 may serve as one or more of a credit card, an access card, a public transportation card, etc. Here, the same or different circuitry and/or a chip 202 may be used when the case 100 is serving as two or more of a credit card, an access card, a public transportation card, etc. The circuitry and/or a chip 202 may function as a universal card emulator. The circuitry and/or a chip 202 may operate in conjunction with an application installed on the mobile device 110. The application may include a data-alert push function so that the user may be alerted when a balance reaches a threshold amount.

Figure 3:
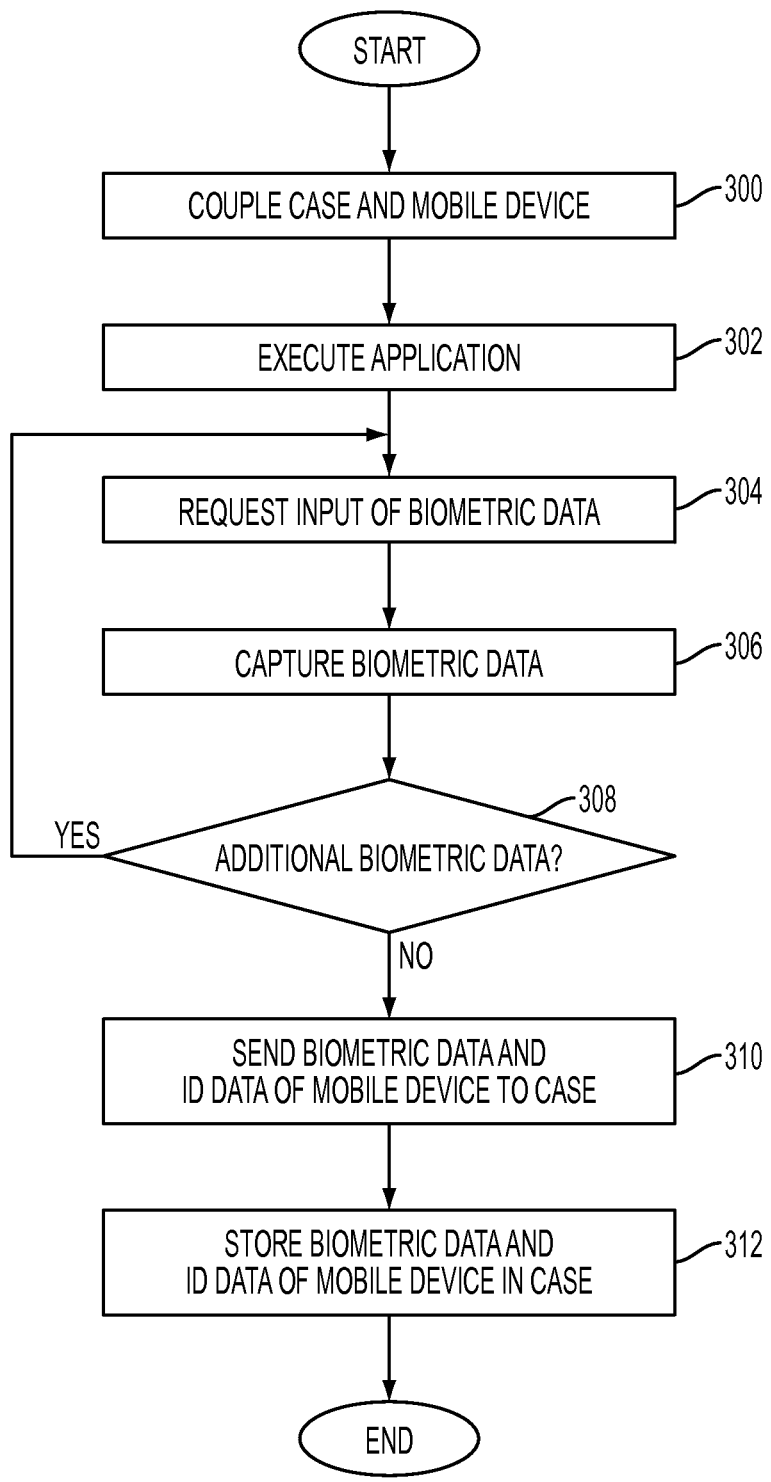
FIG. 3 illustrates a flowchart of a method for inputting and storing biometric data of a user according to an embodiment of the present disclosure.

FIG. 3 illustrates a flowchart of a method for inputting and storing biometric data of a user according to an embodiment of the present disclosure.

Referring to FIG. 3, in operation 300, the case 100 and the mobile device 110 are coupled together. In one embodiment, the coupling between the case 100 and the mobile device 110 may be a physical and communication coupling. However, in another embodiment the coupling between the case 100 and the mobile device 110 may be a communication coupling but not a physical coupling. Herein, the communication coupling may be one of a wireless and a wired communication coupling.

In operation 302, an application for inputting biometric data is executed. The application for inputting biometric data may be executed manually by a user through, for example, a Graphical User Interface (GUI). Alternatively, the application for inputting biometric data may be executed automatically upon the mobile device 110 detecting the coupling with the case 100. Herein, the application for inputting biometric data may be a user installable application, a component of the Operating System (OS), or an application installed by a manufacturer or service provider.

In operation 304, the application for inputting biometric data requests that a user input a biometric data. Herein, when the application for inputting biometric data requests that a user input the biometric data, the application may include an indication of what type of biometric data the user is to input. For example, the application may include an explicit request displayed on a screen of the mobile device 110, or may otherwise cause there to be some type of visual, tactile, or auditory indication to as the type of input desired. Further, the application may include instructions on how the user may input the biometric data. In one embodiment, operation 304 may be omitted.

In operation 306, the application captures the user's biometric data. The user's biometric data may be captured using one of input devices and sensors disposed in the mobile device 110. Alternatively or additionally, user's biometric data may be captured using one of input devices and sensors disposed in the case 100. The application may confirm the successful input of the user's biometric data on a screen of the mobile device 110, or may otherwise confirm the successful input of the user's biometric data using some type of visual, tactile, or auditory indication.

In operation 308, the application determines if there is any additional biometric data to capture. If there is additional biometric data to capture the process returns to operation 304. Otherwise, if there is not additional biometric data to capture, the process proceeds to operation 310.

In operation 310, the application via the mobile device 110, communicates the biometric data and at least one identifying data of the mobile device 110 to the case 100. The at least one identifying data of the mobile device 110 may include, but is not limited to, at least one of a serial number, an International Mobile Equipment Identity (IMEI), and an Integrated Circuit Card ID (ICCID).

In operation 312, the biometric data and at least one identifying data of the mobile device 110 is stored in the case 100. The biometric data at least one identifying data of the mobile device 110 may be stored in the case 100 at the instruction of the application or as an operation of the case 100. The biometric data and/or at least one identifying data of the mobile device 110 may be stored such that it is only able to be stored one time. Thereafter the process according the present embodiment ends.

In another embodiment, operation 310 and operation 312 may occur prior to operation 308. Herein, the at least one identifying data of the mobile device 110 is stored in the case 100 to lock the case 100 to the mobile device 110 so that the case 100 cannot be used with another mobile device 110. However, in another embodiment, the communication of the at least one identifying data of the mobile device 110 in operation 310 and the storage of the at least one identifying data of the mobile device 110 in operation 312 may be omitted so that the case 100 is not locked to the mobile device 110.

Figure 4:
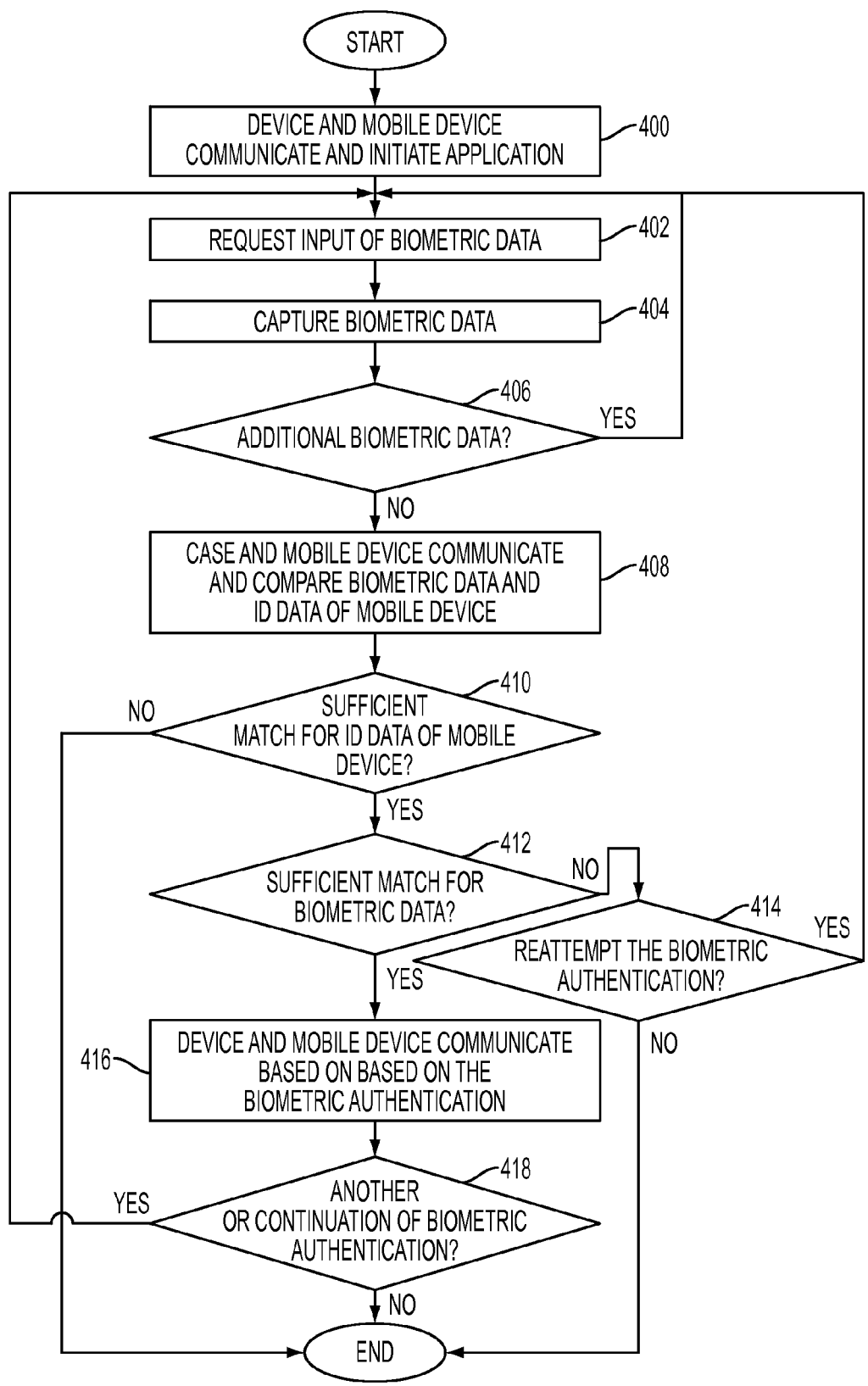
FIG. 4 illustrates a flowchart of a method for biometrically authenticating a user according to an embodiment of the present disclosure.

FIG. 4 illustrates a flowchart of a method for biometrically authenticating a user according to an embodiment of the present disclosure.

In operation 400, the mobile device 110 and a device communicate with each other. The device may be a network device or non-networked device. The communication may be unidirectional or bidirectional and may be initiated by the mobile device 110 or the device. The initiation of the communication may be automatic based on location, receipt of a signal, or other triggering criteria. The initiation of the communication may be initiated at the request of a user or network operator. The communication may cause an application to be initiated that is used for biometrically authenticating a user to perform a function, the application may be already executed, or the application may be manually initiated by the user. The application may be a user installable application, a component of the OS, or an application installed by a manufacturer or service provider. Here, the mobile device 110 may determine the level of security needed and vary the level of biometric security based on the security needs. In one embodiment, operation 400 may be omitted.

In operation 402, the application requests that the user input biometric data. Herein, when the application requests that the user input the biometric data, the application may include an indication of what type of biometric data the user is to input. For example, the application may include an explicit request displayed on a screen of the mobile device 110, or may otherwise cause there to be some type of visual, tactile, or auditory indication to as the type of input desired. Further, the application may include instructions on how the user may input the biometric data. In one embodiment, operation 402 may be omitted.

In operation 404, the application captures the user's biometric data. The user's biometric data may be captured using one of input devices and sensors disposed in the mobile device 110. Alternatively or additionally, user's biometric data may be captured using one of input devices and sensors disposed in the case 100. The application may confirm the successful input of the user's biometric data on a screen of the mobile device 110, or may otherwise confirm the successful input of the user's biometric data using some type of visual, tactile, or auditory indication.

In operation 406, the application determines if there is any additional biometric data to capture. If there is additional biometric data to capture the process returns to operation 402. Otherwise, if there is not additional biometric data to capture, the process proceeds to operation 408

In operation 408, the mobile device 110 and case 100 communicate and compare the captured biometric data and at least one identifying data of the mobile device 110 to the biometric data and at least one identifying data of the mobile device 110 stored in the case 100. In one embodiment, the application compares the captured biometric data and at least one identifying data of the mobile device 110 to the biometric data and at least one identifying data of the mobile device 110 stored in the case 100. In another embodiment, the case 100 compares the captured biometric data and at least one identifying data of the mobile device 110 to the biometric data and at least one identifying data of the mobile device 110 stored in the case 100. The at least one identifying data of the mobile device 110 may include, but is not limited to, at least one of a serial number, an IMEI, and an ICCID.

In operation 410, the application, based on the comparison, determines whether there is a sufficient match between at least one identifying data of the mobile device 110 and at least one identifying data of the mobile device 110 stored in the case 100. If the application, based on the comparison, determines that there is not a sufficient match between the at least one identifying data of the mobile device 110 and at least one identifying data of the mobile device 110 stored in the case 100, the process is terminated. Otherwise, if the application, based on the comparison, determines that there is a sufficient match between the at least one identifying data of the mobile device 110 and at least one identifying data of the mobile device 110 stored in the case 100, the process proceeds to operation 412.

In operation 412, the application, based on the comparison, determines whether there is a sufficient match between the captured biometric data and the biometric data stored in the case 100. Here, there may be threshold criteria used to determine whether there is a sufficient match. For example, each of the plurality of biometric data should be above a threshold amount of similarity for it to be determined that there is a sufficient match. In another example, a threshold number of biometric data should have a match for it to be determined that there is a sufficient match.

If there is not a sufficient match in operation 412, the application notifies the user and presents an inquiry to the user as to whether the user wishes to reattempt the biometric authentication in operation 414. If the user does not wish to reattempt the biometric authentication, the process is terminated. Otherwise, if the user wishes to reattempt the biometric authentication, the process returns to operation 402.

If there is a sufficient match in operation 412, the mobile device 110 and the device communicate based on the biometric authentication in operation 416. Herein, operation 416 varies depending on the embodiment. In one embodiment, biometric authentication enables a biometric pin to be communicated to the device. The biometric pin may be used as credentials to log onto a network or the device. In addition the biometric pin may be communicated with a financial transaction communication in order to add security to the financial transaction. In another embodiment, biometric authentication enables a feature or capability of the mobile device 110 and/or case 100 to be enabled. For example, the biometric authentication may be used to set parental controls. For another example, the biometric authentication may be a part of a Near Field Communication (NFC) transaction, such as a NFC payment. In another embodiment, the biometric authentication triggers information to be displayed on a display of the mobile device 110. In yet another embodiment, biometric authentication enables and/or is a source of encryption of the communication between the mobile device 110 and the device. For example, the biometric authentication may be used as a trigger for encrypting communication between the mobile device 110 and the device. In another example, information used in the biometric authentication may be used as a source of data on which encryption is based.

In operation 418, the mobile device 110 determines if another or a continuation of biometric authentication should be performed. For example, depending on the embodiment implemented for operation 416, biometric authentication should be periodically performed to further enhance security. In one embodiment, the mobile device 110 may act as an input device when logged onto a network or the device. Here, the input for the session also serves as an input of the biometric data of the user for biometric authentication. In another embodiment implemented for operation 416, biometric authentication should be continually performed to further enhance security. For example, a trackpad function may be implemented using a touchscreen of the mobile device 110 that simultaneously serves as an input and sensor for capturing biometric data of the user. For another example, depending on the embodiment implemented for operation 416, biometric authentication may need to be performed again if the user leaves a location or moves greater than a threshold distance from the device. If it is determined in operation 418 that another or a continuation of the biometric authentication should be performed, the process returns to operation 402. Otherwise, if it is determined in operation 418 that another or a continuation of the biometric authentication should not be performed, the process is terminated.

In another embodiment, the communication of the at least one identifying data of the mobile device 110 in operation 408 and the entirety of operation 410 may be omitted.

Herein, the communications between the case 100 and the mobile device 110, such as those described above with respect to FIGS. 3 and 4, may be via wired communications or wireless communications such as NFC communications.

Figure 5:
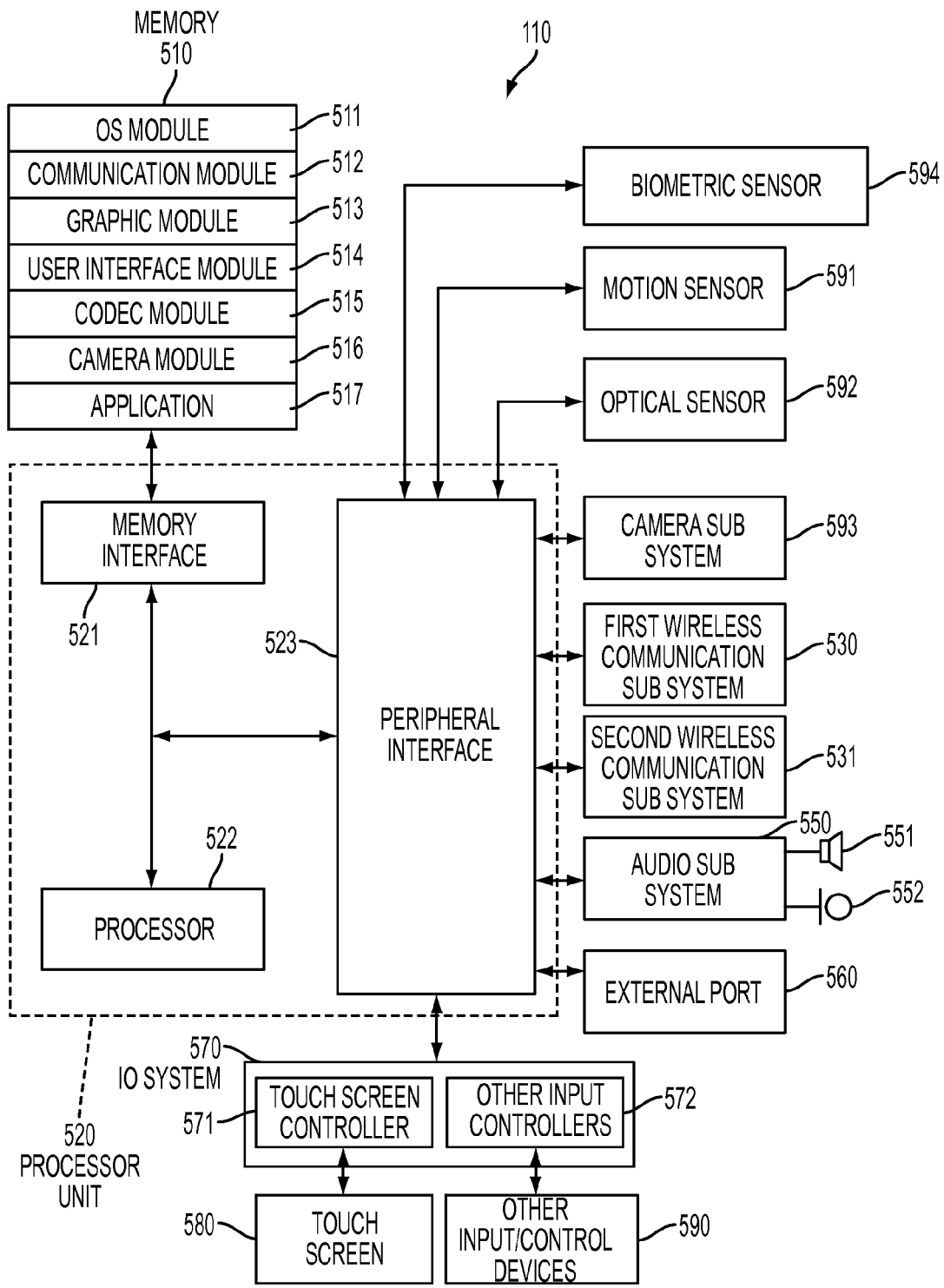
FIG. 5 illustrates a structure of a mobile device according to an embodiment of the present disclosure.

FIG. 5 illustrates a structure of a mobile device according to an embodiment of the present disclosure.

This mobile device 110 can be any electronic device, such as a smartphone, PC, PDA, a tablet PC, a mobile terminal, a PMP, a digital camera, and any other similar and/or suitable electronic device. Also, mobile device 110 may be any electronic device combining two or more functions among the above identified electronic devices. One or more of the constituent elements of the mobile device 110 described herein may be omitted or combined. Similarly, the mobile device 110 may include one or more additional constituent elements.

The mobile device 110 includes a memory 510, a processor unit 520, a first wireless communication sub system 530, a second wireless communication sub system 531, an audio sub system 550, a speaker 551, a microphone 552, an external port 560, an Input Output (IO) sub system 570, a touch screen 580, and other input or control devices 590. The memory 510 and the external port 560 can be used in plurality.

The processor unit 520 can include a memory interface 521, one or more processors 522, and a peripheral interface 523. According to cases, the processor unit 520 may also collectively be referred to as a processor. In the present disclosure, the processor unit 520 can be used to control any of the operations described herein as being performed by the mobile device 110 to be performed by the mobile device 110.

The processor 522 executes various software programs and performs various functions for the mobile device 110, and also performs processing and control for voice communication and data communication. Also, in addition to this general function, the processor 522 plays a role of executing a specific software module (i.e., an instruction set) stored in the memory 510 and performing specific various functions corresponding to the software module. That is, the processor 522 interworks with the software modules stored in the memory 510 and carries out a method of an embodiment of the present disclosure.

The processor 522 can include one or more data processors, image processors, or COder/DECoders (CODECS). The data processor, the image processor, or the CODEC may be constructed separately. Also, the processor 522 may be composed of several processors performing different functions. The peripheral interface 523 connects the IO sub system 570 of the mobile device 110 and various peripheral devices thereof to the processor 522 and to the memory 510 through the memory interface 521.

Various constituent elements of the mobile device 110 can be coupled with one another by one or more communication buses.

The external port 560 is used for direct connecting the mobile device 110 to other electronic devices or indirect connects the portable electronic device to other electronic devices over a network (for example, the Internet, an intranet, a Wireless Local Area Network (WLAN) and the like). For example, the external port 560 refers to, although not limited to, a Universal Serial Bus (USB) port, a FIREWIRE port or the like. Also, the external port 560 may be used to electrically connecting to the case 100.

A motion sensor 591 and an optical sensor 592 are coupled to the peripheral interface 523 and enable various functions. For instance, the motion sensor 591 and the optical sensor 592 can be coupled to the peripheral interface 523, and sense a motion of the mobile device 110 and sense a light from the exterior, respectively. In addition to this, other sensors such as a global positioning system, a temperature sensor, or the like can be coupled to the peripheral interface 523 and perform related functions.

A biometric sensor 594 is coupled to the peripheral interface 523 and enables various functions. For example, biometric sensor 594 can be used to capture a single fingerprint, a multiple finger fingerprint, a palm print, an iris scan, a voiceprint, a facial recognition (with or without motion adjustment), a repeatable motion, a repeatable key or touchscreen input, and any other similar and/or suitable form of biometric data of the user. The biometric sensor 594 may include a plurality of the same or different types of biometric sensors.

A camera sub system 593 can perform a camera function such as picture and video clip recording. The camera sub system 593 can use a Charged Coupled Device (CCD) device or Complementary Metal-Oxide Semiconductor (CMOS) device. The camera sub system 593 can be used to perform the facial recognition (with or without motion adjustment) or the iris scan.

A communication function is performed through one or more wireless communication sub systems 530 and 531. The wireless communication sub systems 530 and 531 can include a Radio Frequency (RF) receiver and transceiver and/or an optical (e.g., infrared) receiver and transceiver. The first wireless communication sub system 530 and the second wireless communication sub system 531 can be distinguished according to a type of communications in which the mobile device 110 communicates. For example, the communications can include a communication sub system designed to operate based on, although not limited to, Global System for Mobile Communication (GSM), Enhanced Data GSM Environment (EDGE), Code Division Multiple Access (CDMA), Wireless-Code Division Multiple Access (W-CDMA), Long Term Evolution (LTE), Orthogonal Frequency Division Multiple Access (OFDMA), Wireless Fidelity (Wi-Fi), Wireless interoperability for Microwave Access (WiMAX), NFC, infrared, white noise spectrum, ultra wideband, wired or wireless Universal Serial Bus (USB), Public-Key Infrastructure (PKI), Secure Sockets Layer (SSL), Secure/Multipurpose Internet Mail Extensions (S/MIME), Bluetooth, and the like. In particular, the one or more wireless communication sub systems 530 and 531 may be used to make NFC transactions, such as NFC payments. At least one of the first wireless communication sub system 530 and the second wireless communication sub system 531 may communicate using multi-frequency spread spectrum. For example, for very secure operations such as logging on to military networks, least one of the first wireless communication sub system 530 and the second wireless communication sub system 531 may communicate using multi-frequency spread spectrum where each frequency uses a different Internet Protocol (IP) address under the IPv6 protocol. Herein, single direction data diode guards may be used to ensure that data can only be transmitted in one direction. The first wireless communication sub system 530 and the second wireless communication sub system 531 may be combined and constructed as one wireless communication sub system. The one or more wireless communication sub systems 530 and 531 may be used to communicate with the case 100.

Herein, the one or more wireless communication sub systems 530 and 531 and the external port 560 may collectively be referred to as a communication unit.

The audio sub system 550 can be coupled to the speaker 551 and the microphone 552, and take charge of input and output of an audio stream such as voice recognition, voice replication, digital recording, and telephony function. That is, the audio sub system 550 communicates with a user through the speaker 551 and the microphone 552. The audio sub system 550 receives a data stream through the peripheral interface 523 of the processor unit 520, converts the received data stream into an electric stream, and forwards the converted electric stream to the speaker 551. The speaker 551 converts the electric stream into human-audible sound waves and outputs the converted sound waves. The microphone 552 converts sound waves forwarded from human or other sound sources into electric streams. Also, the microphone 552 operates if any one of at least two or more second sensors senses that an object is located within a set distance. The audio sub system 550 receives the converted electric streams from the microphone 552. The audio sub system 550 converts the received electric streams into audio data streams, and transmits the converted audio data streams to the peripheral interface 523. The audio sub system 550 can include a detachable earphone, headphone or headset. The audio sub system 550 may be used to capture the voiceprint.

The IO sub system 570 includes a touch screen controller 571 and/or other input controller 572. The touch screen controller 571 can be coupled to the touch screen 580. The touch screen 580 and the touch screen controller 571 can detect a contact and a motion or an interruption thereof, by using, although not limited to, not only capacitive, resistive, infrared and surface acoustic wave technologies for determining one or more contact points with the touch screen 580 but also any multi-touch sensing technology including other proximity sensor arrays or other elements. The other input controller 572 can be coupled to the other input/control devices 590. The other input/control devices 590 can be at least one or more buttons, a rocker switch, a thumb-wheel, a dial, a stick, a pointer device such as a stylus and/or the like.

The touch screen 580 provides an IO interface between the mobile device 110 and a user. That is, the touch screen 580 forwards a user's touch input to the mobile device 110. The touch screen 580 may be used to capture a single fingerprint, a multiple finger fingerprint, or a palm print. Also, the touch screen 580 is a medium for showing an output of the mobile device 110 to the user. That is, the touch screen 580 shows a visual output to the user. This visual output can be presented in form of a text, a graphic, a video, and a combination thereof.

The touch screen 580 can use various displays. For example, the touch screen 580 can use, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The memory 510 can be coupled to the memory interface 521. The memory 510 can include high-speed random access memory and/or non-volatile memory such as one or more magnetic disk storage devices, one or more optical storage devices, and/or flash memories (for example, Not AND (NAND) memories, Not OR (NOR) memories).

The memory 510 stores software. A software constituent element includes an OS module 511, a communication module 512, a graphic module 513, a user interface module 514, a CODEC module 515, a camera module 516, one or more application modules 517 and the like. Also, because the module, the software constituent element, can be expressed as a set of instructions, the module may be expressed as an instruction set. The module may be also expressed as a program. The OS module 511 represents a built-in operating system such as WINDOWS, LINUX, Darwin, RTXC, UNIX, OS X, or VxWorks, and includes various software constituent elements controlling general system operation. Control of the general system operation includes memory management and control, storage hardware (device) control and management, power control and management and the like. Further, the OS software performs even a function of making smooth communication between various hardware (devices) and software constituent elements (modules).

The communication module 512 can enable communication with other electronic devices such as a personal computer, a server, a portable terminal and/or the like, through the first and second wireless communication sub systems 530 and 531 or the external port 560.

The graphic module 513 includes various software constituent elements for providing and displaying a graphic on the touch screen 580. The term 'graphic' is used as meaning including a text, a web page, an icon, a digital image, a video, an animation and the like.

The user interface module 514 includes various software constituent elements associated with a user interface. Further, the user interface module 514 includes information about how a state of the user interface is changed and in which conditions the change of the state of the user interface is carried out, and the like.

The CODEC module 515 can include a software constituent element related to encoding of a video file and decoding thereof. The CODEC module 515 can include a video stream module such as a Moving Picture Experts Group (MPEG) module and/or H204 module. Also, the CODEC module can include several audio file CODEC modules such as Advanced Audio Coding (AAC), Adaptive Multi-Rate (AMR), Windows Media Audio (WMA) and the like. Also, the CODEC module 515 includes an instruction set corresponding to an embodiment method of the present disclosure.

The camera module 516 includes a camera-related software constituent element enabling camera-related processes and functions.

The application module 517 includes a browser, an electronic mail (e-mail), an instant message, word processing, keyboard emulation, an address book, a touch list, a widget, Digital Right Management (DRM), voice recognition, voice replication, a position determining function, a location-based service, an application for inputting biometric data, an application to be initiated that is used for biometrically authenticating a user to perform a function, an application used for communication based on the biometric authentication, such as for performing operation 416 of FIG. 4, an application for a card or ID, and the like.

Also, various functions of the mobile device 110 according to the present disclosure mentioned above and to be mentioned below can be executed by hardware including one or more stream processors, Application Specific Integrated Circuits (ASICs), software, and a combination of them.

Figure 6:
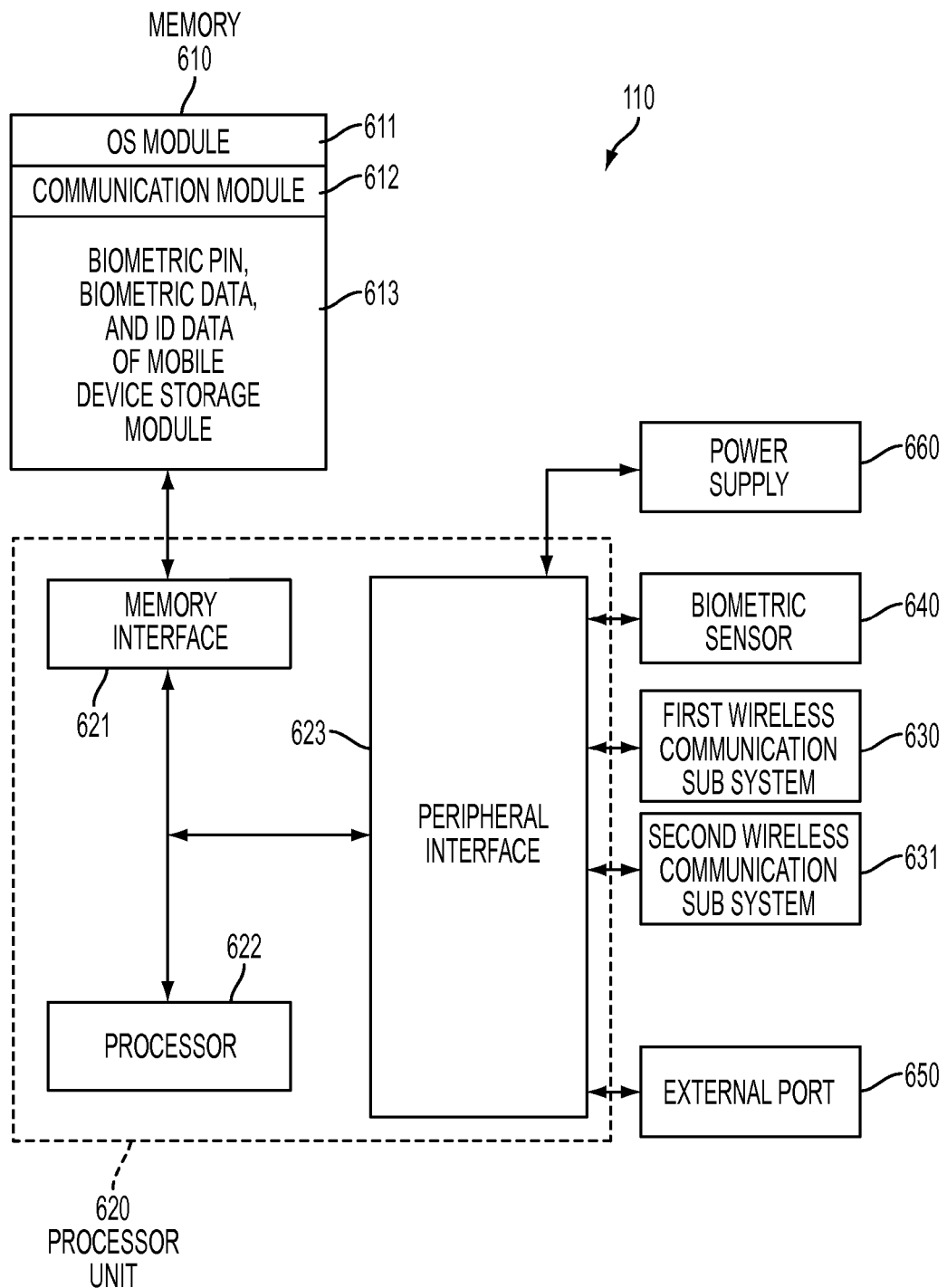
FIG. 6 illustrates a structure of a case for a mobile device according to an embodiment of the present disclosure.

FIG. 6 illustrates a structure of a case for a mobile device according to an embodiment of the present disclosure.

The case 100 includes a memory 610, a processor unit 620, a first wireless communication sub system 630, a second wireless communication sub system 631, a biometric sensor 640, an external port 650, and a power supply 660. The memory 610, biometric sensor 640, and the external port 650 can be used in plurality. One or more of the constituent elements of the case 100 described herein may be omitted or combined. For example, the one or more of the constituent elements of the case 100 described herein may be implemented as a single ASIC. Similarly, the case 100 may include one or more additional constituent elements.

The processor unit 620 can include a memory interface 621, one or more processors 622, and a peripheral interface 623. According to cases, the processor unit 620 may also collectively be referred to as a processor. In the present disclosure, the processor unit 620 can be used to control any of the operations described herein as being performed by the case 100 to be performed by the case 100.

The processor 622 executes various software programs and performs various functions for the case 100, and also performs processing and control for voice communication and data communication. Also, in addition to this general function, the processor 622 plays a role of executing a specific software module (i.e., an instruction set) stored in the memory 610 and performing specific various functions corresponding to the software module. That is, the processor 622 interworks with the software modules stored in the memory 610 and carries out a method of an embodiment of the present disclosure.

The processor 622 can include one or more data processors, comparators, and encryptors. The data processors, comparators, and encryptors may be constructed separately. Also, the processor 622 may be composed of several processors performing different functions. The peripheral interface 623 connects the IO sub system 670 of the case 100 and various peripheral devices thereof to the processor 622 and to the memory 610 and biometric pin, biometric data, and at least one identifying data of the mobile device 110 storage module 613 through the memory interface 621.

Various constituent elements of the case 100 can be coupled with one another by one or more communication buses.

The external port 650 is used for direct connecting the case 100 to the mobile device 110 to other electronic devices or indirect connects the portable electronic device to other electronic devices over a network (for example, the Internet, an intranet, a WLAN and the like). For example, the external port 650 refers to, although not limited to, a USB port, a FIREWIRE port or the like.

A biometric sensor 640 is coupled to the peripheral interface 623 and enables various functions. For example, biometric sensor 640 can be used to capture a single fingerprint, a multiple finger fingerprint, a palm print, an iris scan, a voiceprint, a facial recognition (with or without motion adjustment), a repeatable motion, a repeatable key or touchscreen input, and any other similar and/or suitable form of biometric data of the user. The biometric sensor 640 may include a plurality of the same or different types of biometric sensors.

A communication function is performed through one or more wireless communication sub systems 630 and 631. The wireless communication sub systems 630 and 631 can include a RF receiver and transceiver and/or an optical (e.g., infrared) receiver and transceiver. The first wireless communication sub system 630 and the second wireless communication sub system 631 can be distinguished according to a type of communications in which the case 100 communicates. For example, the communications can include a communication sub system designed to operate based on, although not limited to, GSM, EDGE, CDMA, W-CDMA, LTE, OFDMA, Wi-Fi, WiMAX, NFC, infrared, white noise spectrum, ultra wideband, wired or wireless USB, PKI, SSL, S/MIME, Bluetooth, and the like. In particular, the one or more wireless communication sub systems 630 and 631 may be used to make NFC transactions, such as NFC payments. Also, the communications by the one or more wireless communication sub systems 630 and 631 may include encryption capabilities. At least one of the first wireless communication sub system 630 and the second wireless communication sub system 631 may communicate using multi-frequency spread spectrum. For example, for very secure operations such as logging on to military networks, least one of the first wireless communication sub system 630 and the second wireless communication sub system 631 may communicate using multi-frequency spread spectrum where each frequency uses a different IP address under the IPv6 protocol. Herein, single direction data diode guards may be used to ensure that data can only be transmitted in one direction. The first wireless communication sub system 630 and the second wireless communication sub system 631 may be combined and constructed as one wireless communication sub system. The one or more wireless communication sub systems 530 and 531 may be used to communicate with the mobile device 110.

Herein, the one or more wireless communication sub systems 630 and 631 and the external port 650 may collectively be referred to as a communication unit.

The power supply 660 supplies power to the various components of the case 100. The power supply 660 may derive its power from any one or combination of a battery, a solar cell, an electrical, capacitive, or inductive coupling with the mobile device 110.

The memory 610 can be coupled to the memory interface 621. The memory 610 can include high-speed random access memory and/or non-volatile memory such as one or more magnetic disk storage devices, one or more optical storage devices, and/or flash memories (for example, NAND memories, and NOR memories).

The memory 610 stores software. A software constituent element includes an OS module 611, a communication module 612, a biometric pin, biometric data, and at least one identifying data of the mobile device 110 storage module 613, and one or more application modules 614 and the like. Also, because the module, the software constituent element, can be expressed as a set of instructions, the module may be expressed as an instruction set. The module may be also expressed as a program. The OS module 611 represents a built-in operating system such as WINDOWS, LINUX, Darwin, RTXC, UNIX, OS X, or VxWorks, and includes various software constituent elements controlling general system operation. The OS module 611 may include a secure kernel (e.g., OK4). Control of the general system operation includes memory management and control, storage hardware (device) control and management, power control and management and the like. Further, the OS software performs even a function of making smooth communication between various hardware (devices) and software constituent elements (modules).

The communication module 612 can enable communication with other electronic devices such as a personal computer, a server, a portable terminal and/or the like, through the first and second wireless communication sub systems 630 and 631 or the external port 650.

The biometric pin, biometric data, and at least one identifying data of the mobile device 110 storage module 613 includes one or more of the biometric pin, the biometric data, and the at least one identifying data of the mobile device 110 described herein. The biometric pin, biometric data, and at least one identifying data of the mobile device 110 storage module 613 may include the ability to store the biometric pin, the biometric data, and the at least one identifying data of the mobile device 110 only one time. For example, the biometric pin, biometric data, and at least one identifying data of the mobile device 110 storage module 613 may include a diode that is rendered non-functional either automatically after the data is stored therein or at the instruction of the mobile device 110 or another component of the case 100.

The application module 614 includes an application for inputting biometric data, an application to be initiated that is used for biometrically authenticating a user to perform a function, an application for a card or ID, and the like.

Also, various functions of the case 100 according to the present disclosure mentioned above and to be mentioned below can be executed by hardware including one or more stream processors, ASICs, software, and a combination of them.

Herein, the case 100 may further include a conductive particle based material so as to function as an antenna enhancer as described below with reference to FIG. 7.

Figure 7:
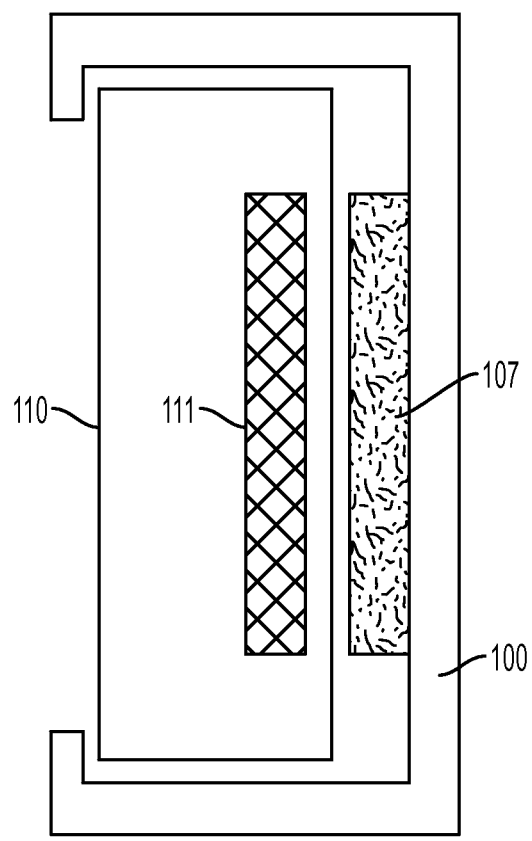
FIG. 7 illustrates an implementation of a conductive particle based antenna enhancer according to an embodiment of the present disclosure.

FIG. 7 illustrates an implementation of a conductive particle based antenna enhancer according to an embodiment of the present disclosure. The particular structure of the conductive particle based antenna shown in FIG. 7 is merely an example used for explanation and is not intended to be limiting. The conductive particle based material used to fabricate the conductive particle based antenna enhancer of FIG. 7 may be the conductive particle based material described in U.S. patent application Ser. No. 13/303,135, filed on Nov. 22, 2011, the entire disclosure of which is hereby incorporated by reference.

Referring to FIG. 7, the mobile device 110 and case 100 are shown. The mobile device 110 includes an internal antenna 111. The case 100 includes a conductive particle based antenna enhancer 107 that is disposed so as to be adjacent to the internal antenna 111 when the mobile device 110 is disposed in the case 100. The conductive particle based antenna enhancer 107 enhances the signal strength of signals transmitted and received by at least one of the mobile device 110 and case 100. The enhancement of the signal strength allows for less energy to be used when transmitting, thereby conserving power and extending battery life.

While the conductive particle based antenna enhancer 107 is shown to correspond to the size of the internal antenna 111, the conductive particle based antenna enhancer 107 may be smaller or larger than the internal antenna 111. In addition, while the conductive particle based antenna enhancer 107 is shown as being disposed immediately adjacent to the internal antenna 111, the conductive particle based antenna enhancer 107 may be disposed at a different location on the case 100.

While the conductive particle based antenna enhancer 107 is shown as being applied to an inner surface of the case 100, the conductive particle based antenna enhancer 107 may be applied to an outer surface of, or may be disposed within, the case 100. When the conductive particle based antenna enhancer 107 is disposed within the case 100, the material used to construct the case 100 may serve as the binder for the conductive particle based material. When, the conductive particle based antenna enhancer 107 is disposed at an inner or outer surface of case 100, one or more of an insulative coating, a surface preparation coating, a protective coating, and a concealment coating may be used. In addition, the conductive particle based antenna enhancer 107 may be formed as an independent structure (with or without a substrate) that is fixed to the case 100.

In one embodiment, the same or a similar conductive particle based material as that described above may be employed to construct any antennas disposed in the case 100 and/or any other portion of the case 100. For example, the conductive particle based material may be used to enhance NFC communications and/or RFID communications since it is operable with spread spectrum (to enhance security), provides for a stronger signal so as thereby reduce power consumption and conserve battery life.

In one embodiment, the same or a similar conductive particle based material as that described above may include near field limiting properties. Thus, the same or a similar conductive particle based material as that described above may be employed in the case 100 to shorten the distance that spread spectrum communications, such as those using NFC communications of the mobile device, can be intercepted. The case 100 may include a magnetic shielding material such that the conductive particle based material is used as an antenna material for the case 100 and is sandwiched between the magnetic shielding material and the mobile device 100 when the mobile device is installed in the case 100. This effectively forms a faraday cage can be created on the back side of the mobile device 110 in very close proximity to an internal antenna (e.g., an NFC antenna) of the mobile device 110, allowing the mobile device 110 and case 100 to still function and communicate while adding further security to the communications there between. This technique will greatly limit the distance the signals (e.g., an NFC signal) between the mobile device 110 and case 100 can travel to a centimeters or less. The conductive particle based material does not produce a strong near field, and the magnetic shielding material will easily limit its propagation distance. Encrypted communication can therefore be confined to the area between the case 100 and the mobile device 110. Thereby, the likelihood of interception of the communications between the case 100 and the mobile device 110 will be reduced.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), Compact Disc (CD)-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for biometric authentication of a user of a mobile device, the method comprising:
coupling the mobile device to a case for the mobile device;
receiving from the mobile device, by the case, biometric data of the user of the mobile device that was captured by the mobile device and identification data of the mobile device;
storing, by the case, the biometric data of the user of the mobile device and the identification data of the mobile device that was received from the mobile device and a biometric pin, wherein the case is configured to only store one time the biometric data of the user of the mobile device and the identification data of the mobile device that was received from the mobile device and the biometric pin;
receiving a request from the mobile device, by the case, for authenticating the user of the mobile device, the request including biometric data captured by the mobile device and identification data of the mobile device;
performing, by the case, a first comparison between the biometric data stored in the case and the biometric data included in the request, and a second comparison between the identification data of the mobile device stored in the case and the identification data of the mobile device included in the request; and
sending to the mobile device, by the case, a response to the request for authenticating the user of the mobile device based on a result of both the first comparison and the second comparison, the response to the request for authenticating the user of the mobile device including the biometric pin if the result of both the first comparison and the second comparison is that there is a match,
wherein the response to the request for authenticating the user of the mobile device is for use by the mobile device to perform an operation based on the authentication of the user.

2. The method of claim 1, wherein the identification data of the mobile device includes a serial number, an International Mobile Equipment Identity (IMEI), and an Integrated Circuit Card Identifier (ICCID).

3. The method of claim 1, wherein the coupling of the mobile device to the case for the mobile device comprises at least one of a physical and communication coupling.

4. The method of claim 1, wherein the case receives from the mobile device and sends to the mobile device through at least one of a wireless and a wired communication.

5. The method of claim 4, wherein the wireless communication is a Near Field Communication (NFC) communication.

6. The method of claim 1, wherein the operation performed by the mobile device based on the authentication of the user comprises at least one of a network login, a device login, and a financial transaction.

7. The method of claim 1, wherein the biometric data comprises at least one of a single fingerprint, a multiple finger fingerprint, a palm print, an iris scan, a voiceprint, a facial recognition without motion adjustment, a facial recognition with motion adjustment, a repeatable motion, a repeatable key input, and a repeatable touchscreen input.

8. The method of claim 1, further comprising emulating, by the case, at least one of a contactless card and a credit card.

9. The method of claim 1, wherein if the user of the mobile device is authenticated, the mobile device displays on a display at least one of an image and alphanumeric characters for identifying the user of the mobile device.

10. The method of claim 1, wherein the case has printed thereon or embedded therein at least one of an image and alphanumeric characters that is visible from the outside for identifying the user of the mobile device.

11. The method of claim 10, wherein if the user of the mobile device is authenticated, the mobile device displays on a display the at least one of the image and alphanumeric characters printed on or embedded in the housing.

12. A case for a mobile device for biometric authentication of a user of the mobile device, the case comprising:
a housing configured to removably retain the mobile device, the housing including a memory, a communication unit, and a processor unit;
the memory configured to only store one time biometric data of a user of the mobile device, identification data of the mobile device, and a biometric pin;
the communication unit configured to communicate with the mobile device; and
the processor unit configured to communicate and control the memory and the communication unit to:
receive from the mobile device biometric data of the user of the mobile device that was captured by the mobile device and identification data of the mobile device,
store one time the biometric data of the user of the mobile device and the identification data of the mobile device that was received from the mobile device and the biometric pin,
receive a request from the mobile device for authenticating the user of the mobile device, the request including biometric data captured by the mobile device and identification data of the mobile device,
perform a first comparison between the biometric data stored in the case and the biometric data included in the request, and a second comparison between the identification data of the mobile device stored in the case and the identification data of the mobile device included in the request, and
send to the mobile device a response to the request for authenticating the user of the mobile device based on a result of both the first comparison and the second comparison, the response to the request for authenticating the user of the mobile device including the biometric pin if the result of both the first comparison and the second comparison is that there is a match,
wherein the response to the request for authenticating the user of the mobile device is for use by the mobile device to perform an operation based on the authentication of the user.

13. The case of claim 12, wherein the identification data of the mobile device includes a serial number, an International Mobile Equipment Identity (IMEI), and an Integrated Circuit Card Identifier (ICCID).

14. The case of claim 12, wherein the communication unit is configured to communicate with the mobile device through at least one of a wireless and a wired communication.

15. The case of claim 14, wherein the wireless communication is a Near Field Communication (NFC) communication.

16. The case of claim 12, wherein the operation performed by the mobile device based on the authentication of the user comprises at least one of a network login, a device login, and a financial transaction.

17. The case of claim 12, wherein the biometric data comprises at least one of a single fingerprint, a multiple finger fingerprint, a palm print, an iris scan, a voiceprint, a facial recognition without motion adjustment, a facial recognition with motion adjustment, a repeatable motion, a repeatable key input, and a repeatable touchscreen input.

18. The case of claim 12, wherein the case further includes a card emulator for emulating at least one of a contactless card and a credit card.

19. The case of claim 12, wherein if the user of the mobile device is authenticated, the mobile device displays on a display at least one of an image and alphanumeric characters for identifying the user of the mobile device.

20. The case of claim 12, wherein the housing has printed thereon or embedded therein at least one of an image and alphanumeric characters that is visible from the outside for identifying the user of the mobile device.

21. The case of claim 20, wherein if the user of the mobile device is authenticated, the mobile device displays on a display the at least one of the image and alphanumeric characters.

* * * * *